US012689030B2

(12) United States Patent
Hwang et al.

(10) Patent No.: US 12,689,030 B2
(45) Date of Patent: Jul. 21, 2026

(54) METAL AND METALLIC ION MIXED BATTERIES AND A METHOD FOR INCREASING CYCLE LIFETIME THEREOF

(71) Applicant: National Taiwan University of Science and Technology, Taipei (TW)

(72) Inventors: Bing-Joe Hwang, Taipei (TW);
Sheng-Chiang Yang, Taipei (TW);
Shi-Kai Jiang, Taipei (TW);
Cheng-Cheng Liu, Taipei (TW);
Ching-Ying Chen, Taipei (TW);
Wei-Nien Su, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 561 days.

(21) Appl. No.: 18/302,052

(22) Filed: Apr. 18, 2023

(65) Prior Publication Data

US 2024/0243268 A1      Jul. 18, 2024

(30) Foreign Application Priority Data

Jan. 18, 2023      (TW) ................................. 112102180

(51) Int. Cl.
| | |
|---|---|
| *H01M 4/38* | (2006.01) |
| *H01M 4/02* | (2006.01) |
| *H01M 4/587* | (2010.01) |
| *H01M 4/66* | (2006.01) |
| *H01M 10/0562* | (2010.01) |
| *H01M 10/0565* | (2010.01) |
| *H01M 10/44* | (2006.01) |

(52) U.S. Cl.
CPC ........... *H01M 4/381* (2013.01); *H01M 4/587* (2013.01); *H01M 4/661* (2013.01); *H01M 10/0562* (2013.01); *H01M 10/0565* (2013.01); *H01M 10/446* (2013.01); *H01M 2004/027* (2013.01); *H01M 2004/028* (2013.01); *H01M 2300/0071* (2013.01); *H01M 2300/0082* (2013.01)

(58) Field of Classification Search
CPC ...... H01M 4/381; H01M 4/587; H01M 4/661; H01M 10/446; H01M 10/0562; H01M 10/0565
See application file for complete search history.

(56) References Cited

U.S. PATENT DOCUMENTS 11,973,178 B2 *      4/2024      Dong .................... H01M 4/134

* cited by examiner

*Primary Examiner* — Karie O'Neill Apicella
(74) *Attorney, Agent, or Firm* — Best & Flanagan LLP

(57) ABSTRACT

The present invention provides a metal and metallic ion mixed battery, which contains a positive electrode, a negative electrode, and an electrolyte, the positive electrode contains a positive electrode material with a metallic component of the battery; It only coats a small amount of negative electrode active materials that can form a metallic ion battery on the negative electrode and makes the negative electrode of the battery included dual advantages of metal and metallic ion battery; when charging, the metallic ions from the positive electrode are embedded in the negative electrode active material to make the battery have the characteristics of a metallic ion battery, and then continue to deposit on the current collector to form a metal battery. After several cycles, the battery can be charged and discharged stably and retains more than 99% of Coulombic efficiency, enhancing the overall energy density of the battery.

7 Claims, 7 Drawing Sheets

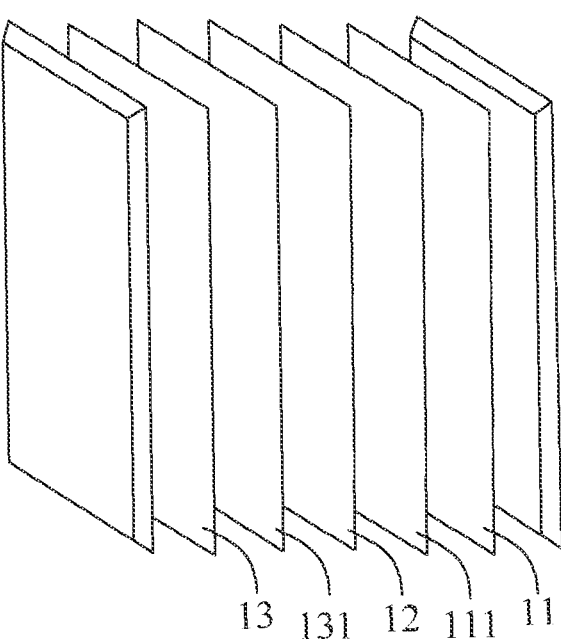
13  131  12  111  11
FIG. 1

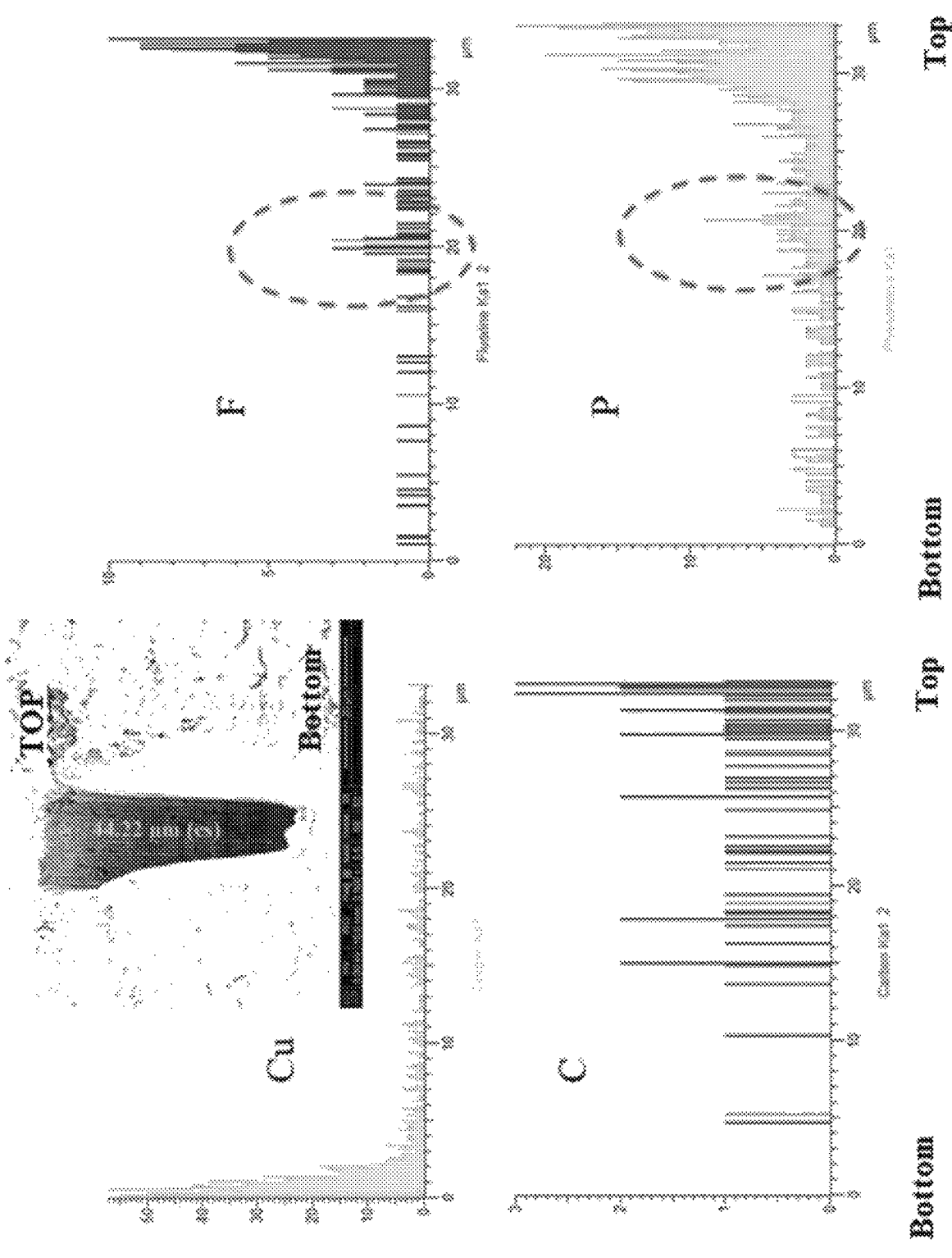

METAL AND METALLIC ION MIXED BATTERIES AND A METHOD FOR INCREASING CYCLE LIFETIME THEREOF

FIELD OF THE INVENTION

The present invention is related to an electrochemical battery, especially to a metal and metallic ion mixed electrochemical battery and the method of increasing the cycle lifetime thereof.

The present invention has been developed primarily to be a lithium ion and lithium metal mixed battery for describing hereinafter with references and multiple embodiments to this application. However, it will be appreciated that the present invention is not limited to this particular type of battery, method, field of use or effect.

BACKGROUND OF THE INVENTION

Although anode-free batteries have a higher energy density, due to the growth of lithium dendrites in the negative electrode, the growth of a poor solid electrolyte interface (SEI), and the side reaction with electrolytes prevents the deposition of dense lithium metal on the negative electrode current collector, resulting in a vicious cycle that consumes the lithium ions provided by the positive electrode, causing a rapid decline in capacitance. Although the current Li-ion battery has a stable and cycle-reversible capacitance, however, the first cycle has a large irreversible capacitance and requires active material for the negative electrode to embed the Li-ion, which inhibits the overall energy density.

In view of the above, how to provide a technology that contains the advantages of both lithium-metal batteries and lithium-ion batteries and can even be extended to other types of electrochemical batteries, is a problem that needs to be solved. Hence, it is eager to have a solution that will overcome or substantially ameliorate at least one or more of the deficiencies of a prior art, or to at least provide an alternative solution to the problems. It is to be understood that, if any prior art information is referred to herein, such reference does not constitute an admission that the information forms part of the common general knowledge in the art.

SUMMARY OF THE INVENTION

In order to solve the present problem that the lithium metal battery capacitance is rapidly decreasing and the energy density of the lithium-ion battery is insufficient, the present invention provides a metal and metal ion mixed battery which not only improves the existing lithium-ion battery capacitance which is prone to rapidly decreasing and the battery energy density which is insufficient but can also be applied to other types of electrochemical battery, comprising:

a positive electrode containing a positive electrode material on the positive electrode, the positive electrode material comprising at least one battery metal component;

a negative electrode containing a negative electrode active material which lithiation/sodiation the metal components contained in the corresponding positive electrode material; and an electrolyte interposed between the positive electrode and the negative electrode; wherein the content (A/C) of the negative electrode active material to the positive electrode material is in the ratio of $0<A/C<1$.

The present invention further provides a method of increasing the cycle life of the above metal and metallic ion mixed battery, comprising the steps of:

providing a metal and metallic ion mixed battery as described above;

charging the metal and metallic ion mixed battery so that the positive electrode material releases the battery metal component therein; and during the charging process, the battery metal component passes through the electrolyte and contacts the negative electrode active material contained in the negative electrode so that the negative electrode active material lithiation/sodiation and forms a metal layer in the negative electrode area to obtain the metal and metallic ion mixed battery having both metal and metallic ion battery characteristics.

From the above description, it can be seen that the present invention provides a mixed battery that combines metal and metallic ion batteries. It only coats a small amount of negative electrode active materials that can form a metallic ion battery on the negative electrode and makes the negative electrode of the battery include dual advantages of metal and metallic ion battery. When charging, the battery metallic ions from the positive electrode are embedded in the negative electrode active material to make the battery have the characteristics of a metallic ion battery, and then continue to deposit on the current collector to form a metal battery. After several cycles, the battery can be charged and discharged stably and retains more than 99% of Coulombic efficiency, enhancing the overall energy density of the battery. Many of the attendant features and advantages of the present invention will become better understood with reference to the following detailed description considered in connection with the accompanying figures and drawings.

BRIEF DESCRIPTION OF THE DRAWINGS

The steps and the technical means adopted by the present invention to achieve the above and other objects can be best understood by referring to the following detailed description of the preferred embodiments and the accompanying drawings.

FIG. 1 is a schematic diagram of the first preferred embodiment of the metal and metallic ion mixed battery of the present invention;

FIG. 4 shows the linear scanning elemental analysis of the metal and metallic ion mixed battery embodiment of the present invention after charging;

DESCRIPTION OF THE PREFERRED EMBODIMENTS

Figure 2:
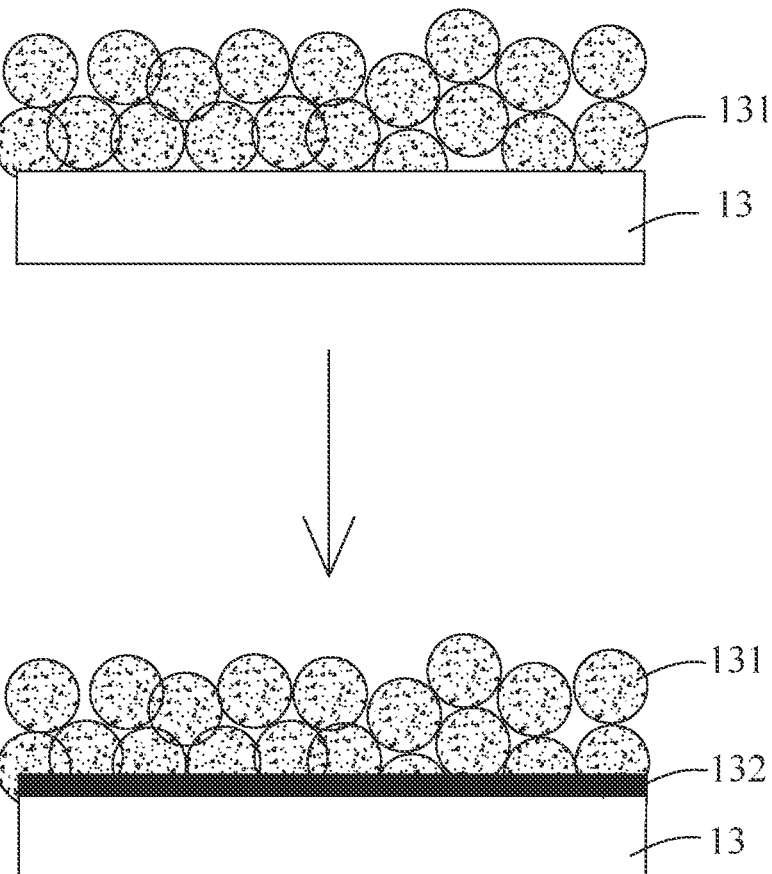
FIG. 2 is a schematic diagram of the flow of the method to increase the cycle lifetime of the metal and metallic ion mixed battery of the present invention.

Reference will now be made in detail to the present preferred embodiments of the invention, examples of which are illustrated in the accompanying drawings. Wherever possible, the same reference numbers are used in the drawings and the description to refer to the same or like parts. It is not intended to limit the method by the exemplary embodiments described herein. In the following detailed description, for purposes of explanation, numerous specific details are set forth in order to attain a thorough understanding of the disclosed embodiments. It will be apparent, however, that one or more embodiments may be practiced without these specific details. As used in the description herein and throughout the claims that follow, the meaning of "a", "an", and "the" may include reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to.

Embodiment 1 of Metal and Metallic Ion Mixed Battery

Referring to FIG. 1, which is the first preferred embodiment of a metal and metallic ion mixed battery 10 provided by the present invention, comprising a positive electrode 11, a negative electrode 13, and an electrolyte 12 interposed therebetween, wherein the positive electrode 11 comprises, but is not limited to, a metal foil, such as an aluminum foil, etc. The positive electrode 11 contains a positive electrode material 111, which contains at least one battery metal component, which may be a lithium or sodium metal ion or metal. The so-called battery metal component is an electrochemical battery formed by a currently available metal, such as a lithium battery or a sodium battery. The metal and metallic ion used in the present invention are the same metal and its ion, for example, as a lithium battery, in the present invention, therefore, provides a lithium metal and lithium ion mixed battery, and as a sodium battery, a sodium metal and sodium ion mixed battery, and so on.

The positive electrode material 111 in the present invention varies depending on the lithium or sodium battery, but the applicable positive electrode material 11 is all kinds of positive electrode materials that are currently technically or commercially available for use in the corresponding lithium or sodium batteries. The preferred embodiments of the present embodiment include the positive electrode materials listed in Tables 1 and 2 below, but the present invention is not limited to only those materials of those embodiments.

TABLE 1

| Applicable Positive Electrode materials for lithium batteries. | |
| --- | --- |
| Nickel-Cobalt-Aluminum Positive Electrode Materials (NCA) | $LiNi_xCo_yAl_zO_2$, wherein $x + y + z = 1$. |
| Nickel-Cobalt-Manganese Positive Electrode Materials (NCM) | $LiNi_xCo_yMn_zO_2$, wherein $x + y + z = 1$. |
| Lithium Cobaltate Positive Electrode Materials (LCO) | $LiCoO_2$ |
| Lithium Manganate Positive Electrode Materials (LMO) | $LiMn_2O_4$ |
| Metal-doped Lithium Manganate Positive Electrode Materials (LM'MO) | $LiM'_xM_yO_4$, wherein M' is Mn; M is Fe, Co, Al, Cr, Ni, or Cu, and $x + y = 2$. |
| Lithium Manganese Phosphate Positive Electrode Materials (LMP) | $LiMPO_4$, wherein M is Fe, Co, Al, Cr, Ni, Cu, or Mn. |
| Lithium-Iron Phosphate Positive Electrode Materials (LFP) | $LiFePO_4$ |
| Metal-doped Lithium-Iron Phosphate Positive Electrode Materials (LMFP) | $LiM_xFe_yPO_4$ (F is Fe; M is Co, Al, Cr, Ni, Cu, or Mn, and $x + y = 1$. |
| Lithium Sulfide Positive Electrode Materials | $Li_2S$ |

TABLE 2

| Applicable positive electrode materials for sodium batteries. | |
| --- | --- |
| Prussian Blue Positive Electrode Materials | $Na_xMa\,[Mb(CN)_6]$, Ma is Fe, Mn, Ni, Mb is Fe, Mn. |
| Nickel-Cobalt-Aluminum Positive Electrode Materials | $NaNi_xCo_yMn_zO_2$, wherein $x + y + z = 1$. |
| Sodium Cobaltate Positive Electrode Materials | $NaCoO_2$ |
| Sodium Manganate Positive Electrode Materials | $NaMn_2O_4$ |
| Metal-doped Sodium Manganate Positive Electrode Materials | $NaM'_xM_yO_4$, wherein M' is Mn; M is Fe, Co, Al, Cr, Ni, or Cu, and $x + y = 2$. |
| Sodium Manganese Phosphate Positive Electrode Materials | $NaMPO_4$, wherein M is Fe, Co, Al, Cr, Ni, Cu, or Mn. |
| Sodium Iron Phosphate Positive Electrode Materials | $NaFePO_4$ |

TABLE 2-continued

| Applicable positive electrode materials for sodium batteries. | |
| --- | --- |
| Metal-doped Sodium Iron Phosphate Positive Electrode Materials | $NaM_xFe_yPO_4$, wherein F is Fe; M is Co, Al, Cr, Ni, Cu, or Mn, and x + y = 1. |
| Metal-doped Sodium Phosphate, Sodium Sulfate, or Sodium Vanadate Positive Electrode Materials | $Na_xM_y[(XO_m)n^-]_z$, wherein, M is a metal ion with multiple electrovalences, X is P, S, or V. |

The negative electrode 13 in the present invention contains all negative electrodes that can be used for lithium or sodium batteries, a preferred embodiment includes a current collector, such as a copper foil, or may also include carbon materials such as hard carbon, soft carbon, coke, asphalt, nano carbon tubing (CNT), or N-doped carbon, P-doped carbon, B-doped carbon; further also includes sodium titanate ($Na_2Ti_3O_7$), molybdenum disulfide ($C—MoS_2$), titanium disulfide ($TiS_2$), iron disulfide ($FeS_2$), antimony (Sb), tin (Sn), tin disulfide ($SnS_2$), ferrous sulfate ($FeSO_4$), nickel phosphide ($NiP_3$), antimony trisulfide ($Sb_2S_3$), antimony oxide ($Sb_2O_4$), or a tin-antimony alloy (SnSb).

Also, the negative electrode 13 contains a negative electrode active material 131 which can lithiation/sodiation the metal components contained in the corresponding positive electrode material 111, comprising a carbon-containing compound, such as natural or artificial graphite, tin, tin-containing compound or oxide, silicon, silicon-containing compound or oxide, aluminum-containing compound, germanium, germanium-containing compound or oxide, lithium titanium oxide (LTO), such as $Li_4Ti_5O_{12}$, or a combination thereof. For example, in the case of a lithium battery, the battery metal of the positive electrode material 111 is lithium and the negative electrode active material 131 contains the aforementioned types of materials that can be lithiated.

The negative electrodeactive material 131 herein described in the present invention is preferred to be the negative electrode active material 131 which can be lithiation/delithiation or sodiation/desodiation. The negative electrode active material 131 has a ratio (Anode/Cathode ratio, A/C ratio) of 0<A/C<1 to the battery metal component (content) of the positive electrode material 111; or specifically a ratio (A/C ratio) of the amount (or content) of the supplied metal of the battery of the negative electrode material 131 to the positive electrode material 111 of 0<A/C<1, which means that the battery metal content of the positive electrode material 111 is greater than that of the negative electrode material 131, specifically A/C=0.05/1=0.05 or A/C=0.2/1=0.2.

The electrolyte 12 in the present invention comprises a liquid electrolyte or a solid electrolyte. The liquid electrolyte may be any suitable liquid electrolyte used in the present invention, such as but not limited to, 3 M $LiPF_6$ in EC/EMC (V/V=3/7)+50% TTE 1 ml, and the solid electrolyte comprises a sulfide solid electrolyte, an oxide solid electrolyte, and a polymer solid electrolyte, or a combination thereof. The battery provided in this embodiment is an anode-free lithium metal battery in which electrolyte 12 is the liquid electrolyte. The present invention forms the metal and metallic ion mixed battery 10 by adding some of the negative electrode active material 131 onto the negative electrode 13 which does not contain the negative electrode material 131.

<Method to Increase the Cycle Lifetime of Battery>

Referring to FIG. 2, the present invention provides a method for increasing the cycle life of the metal and metallic ion mixed battery 10 mentioned above during charging and discharging, the steps of which include:

Step S1) providing a metal and metallic ion mixed battery as described above;

Step S2) charging the metal and metallic ion mixed battery 10 such that the positive electrode material 111 releases the battery metal component therein; and Step S3) during the charging process, the battery metal component passes through the electrolyte 12 and contacts the negative electrode active material 131 contained on the negative electrode 13, so that the negative electrode active material 131 lithiation or soliation and forms a metal layer 132 (i.e., the battery metal layer) in the negative electrode 13 area to obtain the metal and metallic ion mixed battery 10 having both metal and metallic ion battery characteristics. By using this metal layer 132, the cycle lifetime and overall energy density of the original battery can be significantly increased.

<Validity Test>

Figure 3A:
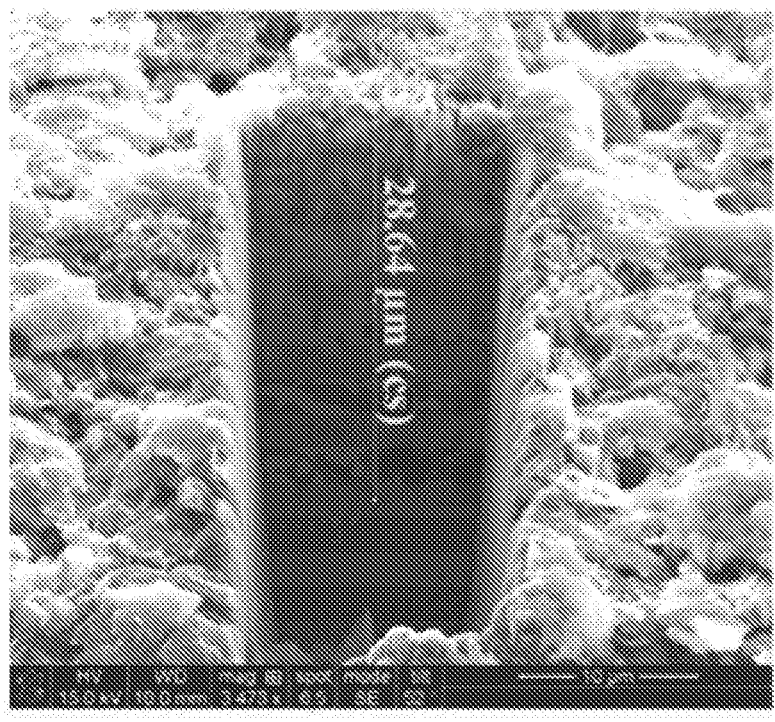
FIGS. 3A and 3B are scanning electron microscopy (SEM) images of the metal and metallic ion mixed battery embodiment of the present invention before and after charging using a focused ion beam (FIB), respectively.
Figure 3B:
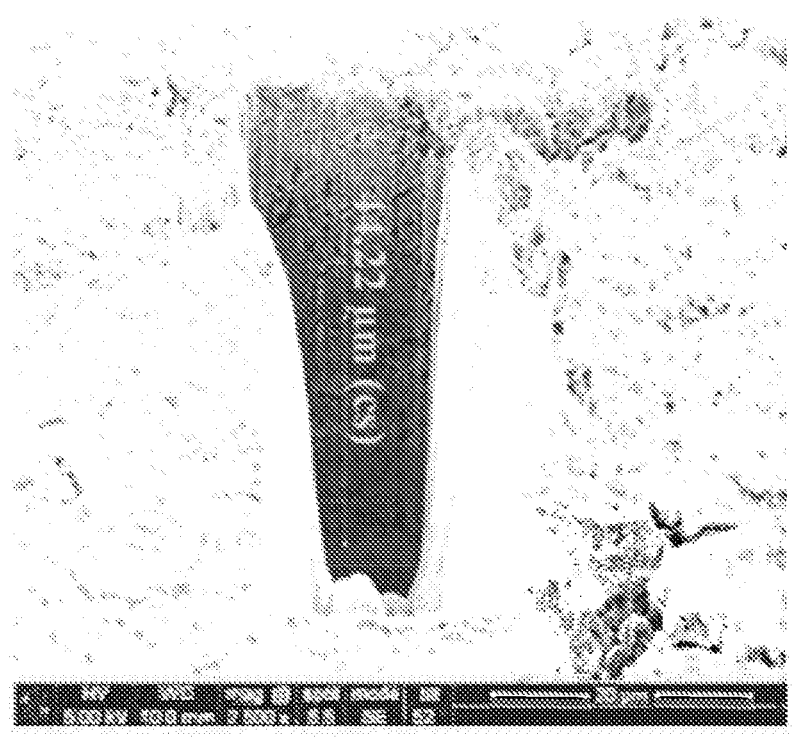

Referring to FIGS. 3A and 3B, which take a lithium metal and lithium-ion mixed battery as an example in the present invention and show the scanned electron microscopy (SEM) images by using a focused ion beam (FIB) on the above lithium metal and lithium-ion mixed battery 10 Embodiment 1 before and after charging (uncycled and cycled/or at least a full life cycle). As can be seen before and after charging, the structure on the negative electrode 13 thickens after charging, which indicates that the lithium metal layer has actually been deposited. The increasing thickness is metallic ion electrode and metal deposition.

Refer to FIG. 4, which shows the post-charging (cycled) elemental analysis (Line Scan) of the lithium metal and lithium-ion mixed battery 10 Embodiment 1 of the preferred embodiment of the present invention. In the figure, C represents carbon, which has less signal at the bottom (or even no signal), which means that lithium deposited at the bottom (between the copper foil and graphite), and analyze the signals of the fluorine (F) and phosphorus (P), indicating the Electrolyte Interphase (SEI) generation, with a larger signal at the top, mainly the SEI has been divided onto the top (where the electrolyte interface is), and there is a clear signal at the place of about 20 μm, which represents the SEI signal at the interface between the lithium metal layer and the graphite layer, and this demonstrates the charging mechanism of the metal and metallic ion mixed battery Embodiment 1 of the present invention. The signal being cycled on the right of the FIG. 4 is exact interface of the metal and metallic ion mixed battery which could also contribute to prove that the present invention has successfully create a new type of metal and metallic ion mixed battery benefit from both metal battery and metallic ion battery.

Figure 5A:
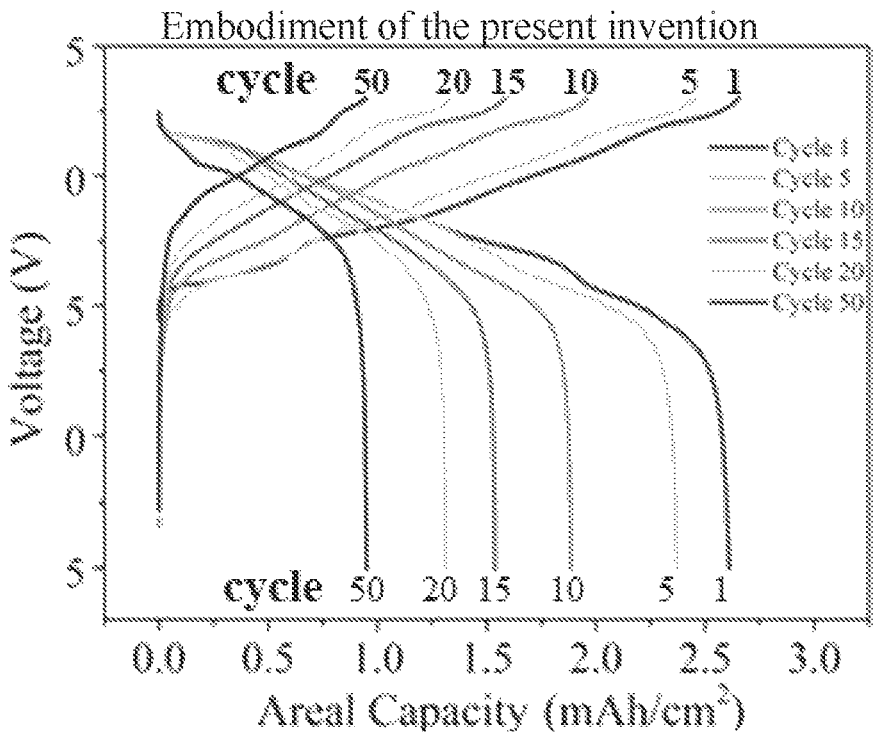
FIGS. 5A and 5B show the comparative results of the cycle number voltage and capacitance test for the metal and metallic ion mixed battery embodiment of the present invention and the anode-free solid-state lithium metal battery, respectively.
Figure 5B:
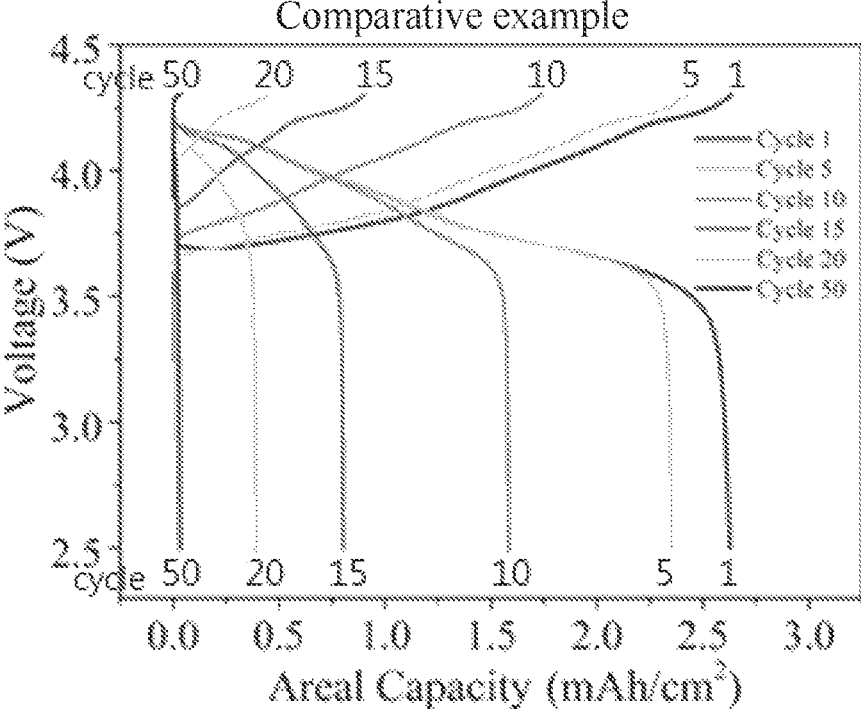

Referring to FIGS. 5A and 5B, the comparative results of the multiple life cycled voltage and capacitance test are shown for the preferred embodiment of the lithium metal and lithium-ion mixed battery 10 of the present invention and an anode-free lithium metal battery as a comparative example, respectively. The A/C ratio of the metal and metallic ion mixed battery 10 Embodiment 1 of the present invention is 0.2, the positive electrode material 111 used is NMC 811, and the negative electrode 13 is a bare copper foil. The comparative example is an anode-free lithium metal battery with an A/C ratio of 0. The test uses a current of 0.4 mA/cm², a voltage range of 2.5-4.3V, and electrolyte 12 used in both samples is a liquid electrolyte containing the composition ratio of 3 M LiPF6 in EC/EMC (V/V=3/7) and 50% TTE in 1 ml solvent. As shown in FIGS. 5A and 5B, the deposited lithium metal is protected by the lithiated negative electrode material, which is less likely to cause excessive side reactions with the electrolyte and effectively inhibits the formation of lithium dendrites.

Figure 6:
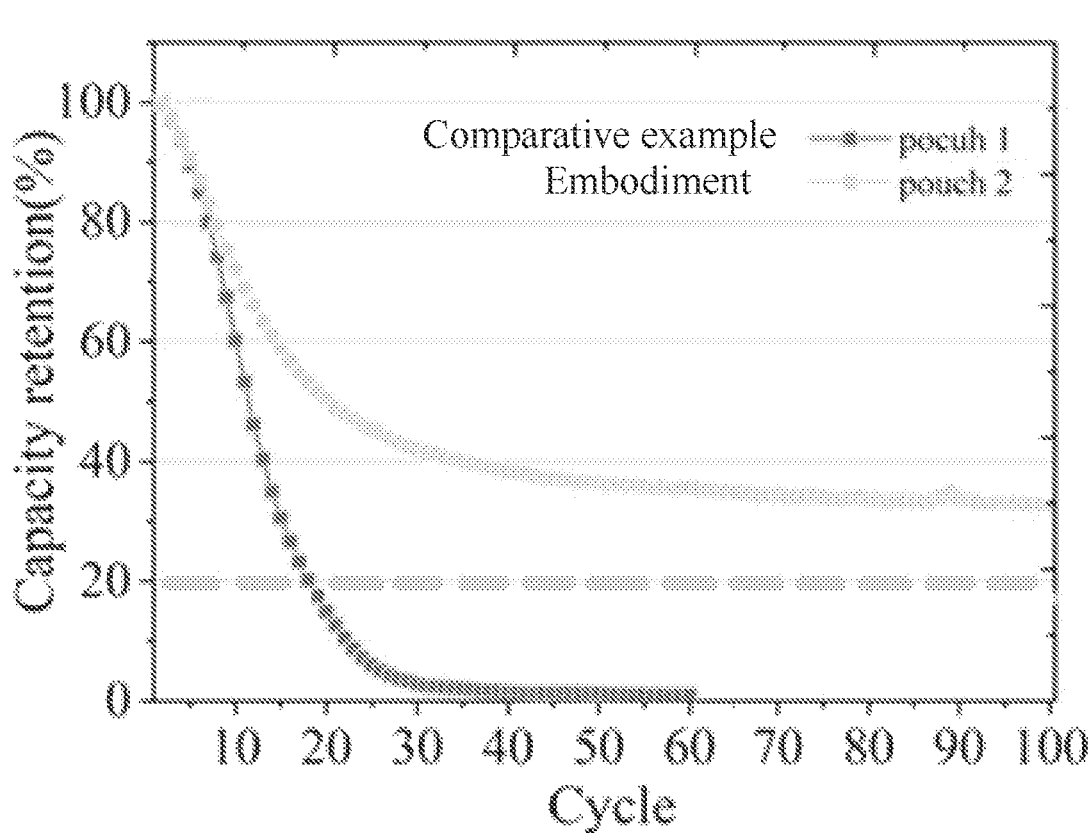
FIG. 6 shows the capacitance test results of a preferred embodiment of the metal and metallic ion mixed battery of the present invention and the comparative example.
Figure 7:
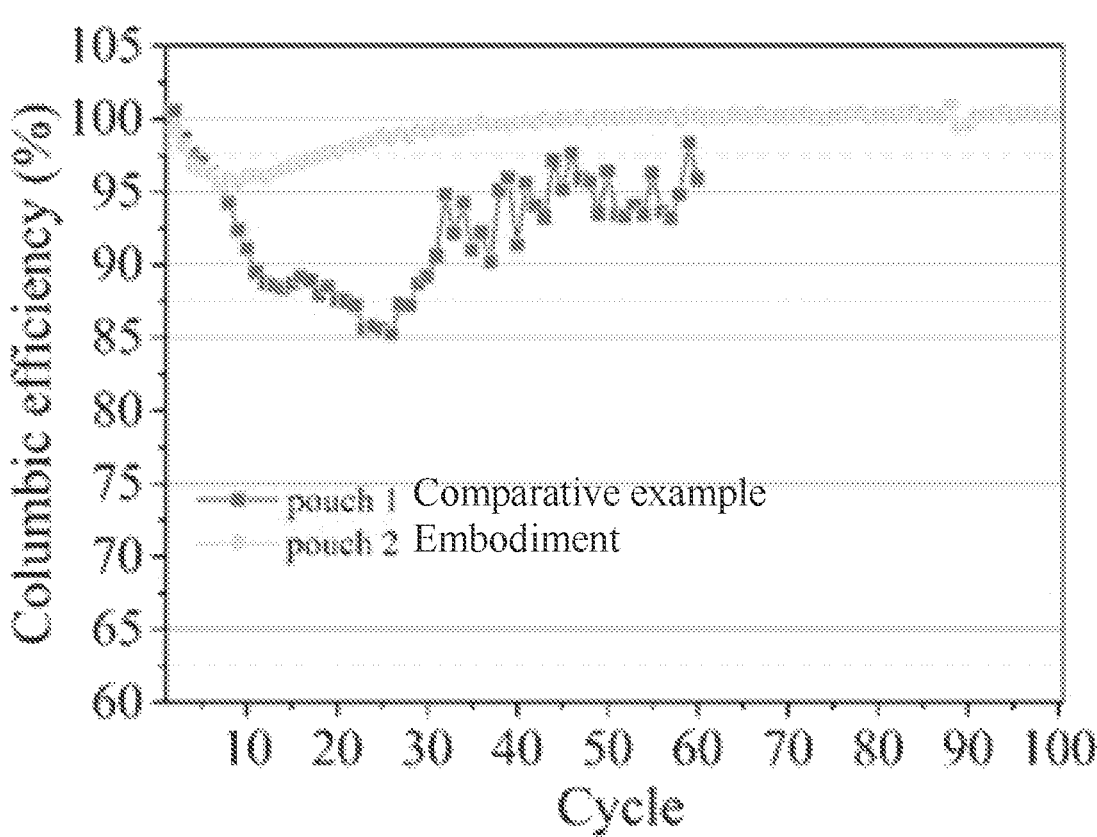
FIG. 7 shows the Coulombic efficiency test results for the preferred embodiment of the metal and metallic ion mixed battery and the comparative example.

Referring to FIG. 6 and FIG. 7, which are the results of the capacitance and coulombic efficiency tests of the lithium metal and lithium-ion mixed battery 10 of the preferred embodiment of the present invention and the comparative example. As shown in the results, since the lithium ions are buffered by the lithiated lithium metal layer of the lithium metal, a more uniform lithium metal is formed on the current collector of the negative electrode 13. After charging and discharging (Embodiment 1 of the present invention, after 35 cycles), the Coulombic efficiency can reach nearly 100%, which is obviously superior to the comparative example. Assume the lithium ion battery (A/C=1) is stable that can contribute 100% capacity. The A/C=0.2 is 20% capacity (at least, from lithium ion part) in this mixed battery. This embodiment is the lithium metal and lithium-ion mixed battery 10 with its A/C=0.2. In FIG. 6, the embodiment of the present invention shows a 35% capacity retention at 100 cycles which is higher than the conventional lithium ion battery, indicating that the present invention presented with both lithium metal and lithiumion mixed batteries character. For the anode-free lithium metal battery of comparative example with A/C=0. At 40 cycles, the comparative example has its capacity retention near to 0%. The results demonstrate an improvement of the embodiment, which not only can provide higher capacity retention than the conventional lithium ion battery but also can extend the function of the lithium metal battery above cycles.

The above specification, examples, and data provide a complete description of the present disclosure and use of exemplary embodiments. Although various embodiments of the present disclosure have been described above with a certain degree of particularity, or with reference to one or more individual embodiments, those with ordinary skill in the art could make numerous alterations or modifications to the disclosed embodiments without departing from the spirit or scope of this disclosure.

What is claimed is:

1. A metal and metallic ion mixed battery, containing:
a positive electrode containing a positive electrode material on the positive electrode, the positive electrode material comprising at least one battery metal component;
a negative electrode containing a negative electrode active material which lithiation/sodiation the metal components contained in the corresponding positive electrode material; and
an electrolyte interposed between the positive electrode and the negative electrode; wherein
the ratio (Anode(Negative)/Cathode(Positive), A/C) of the supplied battery metal amount of the negative electrode active material to that of the positive electrode material is 0<A/C<1.

2. The metal and metallic ion mixed battery according to claim 1, wherein: the metal and metallic ion mixed battery forms a metal layer in the negative electrode area after at least one charge.

3. The metal and metallic ion mixed battery according to claim 1, wherein:
the battery metal component comprises lithium or sodium;
the positive electrode comprises a metal foil;
the positive electrode materials contain nickel-cobalt-aluminum positive electrode materials, nickel-cobalt-manganese positive electrode materials, lithium cobaltate positive electrode materials, sodium cobaltate positive electrode materials, lithium manganate positive electrode materials, sodium manganate positive electrode materials, metal-doped lithium manganate positive electrode materials, metal-doped sodium manganate positive electrode materials, lithium-manganese phosphate positive electrode materials, metal-doped sodium manganate positive electrode materials, lithium-iron phosphate positive electrode materials, sodium-iron phosphate positive electrode materials, metal-doped lithium-iron phosphate positive electrode materials, metal-doped sodium-iron phosphate positive electrode materials, lithium sulfide positive electrode materials, or Prussian blue positive electrode materials;
the negative electrode contains a current collector, carbon material, sodium titanate, molybdenum disulfide, titanium disulfide, iron disulfide, antimony, tin, tin disulfide, ferrous sulfate, nickel phosphide, antimony trisulfide, antimony oxide, or a tin-antimony alloy;
the negative electrode active material comprises a carbon-containing compound, tin, tin-containing compound or oxide, silicon, silicon-containing compound or oxide, aluminum-containing compound, germanium, germanium-containing compound or oxide, lithium-titanium oxide, or a combination thereof; or
the electrolyte contains a liquid electrolyte or a solid electrolyte.

4. The metal and metallic ion mixed battery according to claim 2, wherein:
the battery metal component comprises lithium or sodium;
the positive electrode comprises a metal foil;
the positive electrode materials contain nickel-cobalt-aluminum positive electrode materials, nickel-cobalt-manganese positive electrode materials, lithium cobaltate positive electrode materials, sodium cobaltate positive electrode materials, lithium manganate positive electrode materials, sodium manganate positive electrode materials, metal-doped lithium manganate positive electrode materials, metal-doped sodium manganate positive electrode materials, lithium-manganese phosphate positive electrode materials, metal-doped sodium manganate positive electrode materials, lithium-iron phosphate positive electrode materials, sodium-iron phosphate positive electrode materials, metal-doped lithium-iron phosphate positive electrode materials, metal-doped sodium-iron phosphate positive electrode materials, lithium sulfide positive electrode materials, or Prussian blue positive electrode materials;
the negative electrode contains a current collector, carbon material, sodium titanate, molybdenum disulfide, titanium disulfide, iron disulfide, antimony, tin, tin disulfide, ferrous sulfate, nickel phosphide, antimony trisulfide, antimony oxide, or a tin-antimony alloy;

the negative electrode active material comprises a carbon-containing compound, tin, tin-containing compound or oxide, silicon, silicon-containing compound or oxide, aluminum-containing compound, germanium, germanium-containing compound or oxide, lithium-titanium oxide, or a combination thereof; or the electrolyte contains a liquid electrolyte or a solid electrolyte.

5. The metal and metallic ion mixed battery according to claim 3, wherein:

the battery metal component comprises lithium or sodium;

the positive electrode comprises a metal foil;

the positive electrode materials contain nickel-cobalt-aluminum positive electrode materials, nickel-cobalt-manganese positive electrode materials, lithium cobaltate positive electrode materials, sodium cobaltate positive electrode materials, lithium manganate positive electrode materials, sodium manganate positive electrode materials, metal-doped lithium manganate positive electrode materials, metal-doped sodium manganate positive electrode materials, lithium-manganese phosphate positive electrode materials, metal-doped sodium manganate positive electrode materials, lithium-iron phosphate positive electrode materials, sodium-iron phosphate positive electrode materials, metal-doped lithium-iron phosphate positive electrode materials, metal-doped sodium-iron phosphate positive electrode materials, lithium sulfide positive electrode materials, or Prussian blue positive electrode materials;

the negative electrode contains a current collector, carbon material, sodium titanate, molybdenum disulfide, titanium disulfide, iron disulfide, antimony, tin, tin disulfide, ferrous sulfate, nickel phosphide, antimony trisulfide, antimony oxide, or a tin-antimony alloy;

the negative electrode active material comprises a carbon-containing compound, tin, tin-containing compound or oxide, silicon, silicon-containing compound or oxide, aluminum-containing compound, germanium, germanium-containing compound or oxide, lithium-titanium oxide, or a combination thereof; or the electrolyte contains a liquid electrolyte or a solid electrolyte.

6. The metal and metallic ion mixed battery according to claim 4, wherein:

the metal foil of the positive electrode contains an aluminum foil;

the current collector of the negative electrode contains a copper foil;

the carbon material of the negative electrode comprises hard carbon, soft carbon, coke, bitumen, nano carbon tubing, N-doped carbon, P-doped carbon, B-doped carbon or a combination thereof; and the solid electrolyte comprises a sulfide solid electrolyte, an oxide solid electrolyte and a polymer solid electrolyte, or a combination thereof.

7. A method for increasing the cycle lifetime of the battery, comprising the steps of:

providing a metal and metallic ion mixed battery as claimed in claim 1;

charging the metal and metallic ion mixed battery so that the positive electrode material releases the battery metal component therein; and during the charging process, the battery metal component passes through the electrolyte and contacts the negative electrode active material contained in the negative electrode so that the negative electrode active material lithiation/sodiation and forms a metal layer in the negative electrode area to obtain the metal and metallic ion mixed battery having both metal and metallic ion battery characteristics.

\* \* \* \* \*